June 26, 1956 H. KIETZ ET AL 2,751,703
FISHNET ADJUSTABLE IN DEPTH
Filed March 17, 1952 2 Sheets-Sheet 1

INVENTOR.
Hans Kietz
Theodor Lemann
BY
Ezekiel Wolf
their attorney

2,751,703
FISHNET ADJUSTABLE IN DEPTH

Hans Kietz, Bremen, Theodor Leman, Eystrup, and Martin Schumacher, Bremen, Germany, assignors to Atlas-Werke Aktiengesellschaft, Bremen, Germany, a firm Application March 17, 1952, Serial No. 276,906

11 Claims. (Cl. 43—8)

This invention relates to fishing equipment, and more particularly to auxiliary fishing equipment comprising a fishing net and device for regulating the depth level of the net.

It is an object of the present invention to facilitate the adjustment of the fishing net. This is achieved, according to the invention, by combining an echo sounder for obtaining an indication of the time elapsing before the return of the echo from a shoal of fish and a device for measuring the depth of the net in such a manner that said depth of the fishing net as well as of said shoal of fish is indicated on a common depth scale.

It is a further object of the invention to facilitate the setting of the fishing net at a predetermined depth by providing a hand-adjustable control device for adjusting the depth level of the fishing net, the control device being connected with a control indicator at the common depth scale.

The various objects and advantages of the present invention will be more apparent upon considering the following detailed description of typical embodiments thereof illustrated in the accompanying drawings in which Fig. 1 is a side view of a fish net and a device for adjusting the depth of the fishing net in operation;

Figure 5:
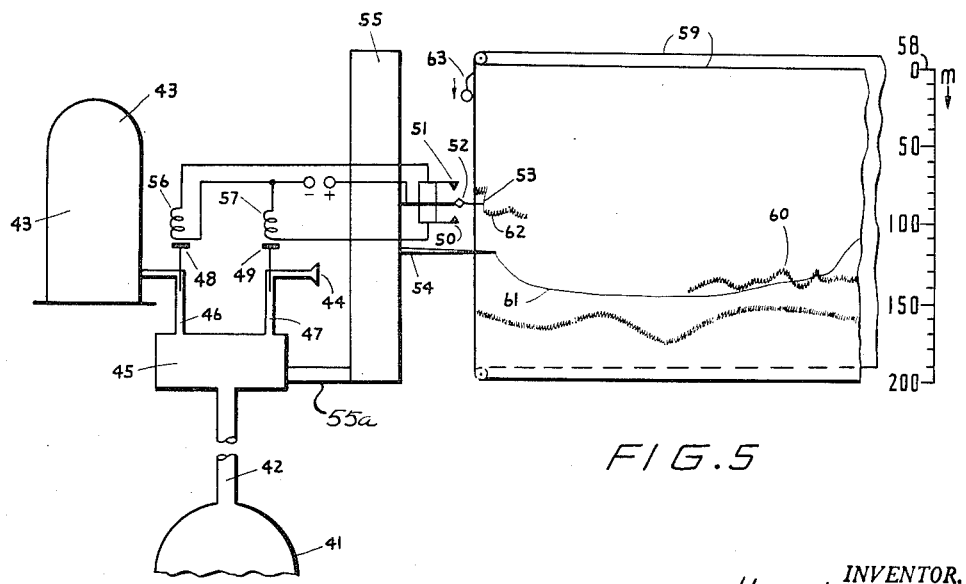

Fig. 5 a modified form of device for net adjustment.

A net 2 towed by a vessel 1 is opened and kept at its correct floating level by two wings 3 and 4, weight 5 attached to the lower side of the net and floats 6 attached to the upper side of the net. Both the wings and the points at which lines 7 and 8 are attached to the net are at the same level. If the vessel is not in motion, i. e., if dynamic forces are lacking, the net will sink to the bottom; if, on the other hand the vessel is in motion, traction power $p$ on the lines will develop a vertical component force V thus raising the net to the point where due to decreasing depth and inclination of the lines the diminishing dynamic vertical force V will counterbalance the downward traction of the net.

Figure 1:
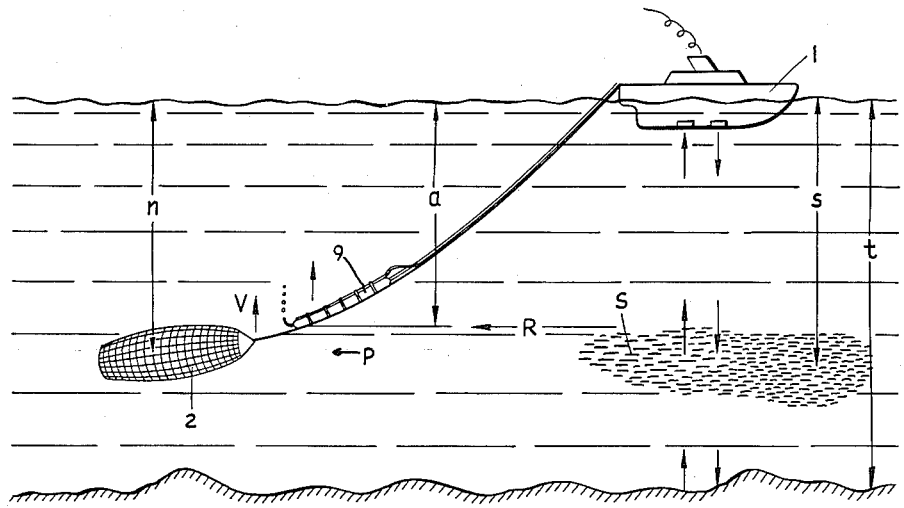
Figure 2:
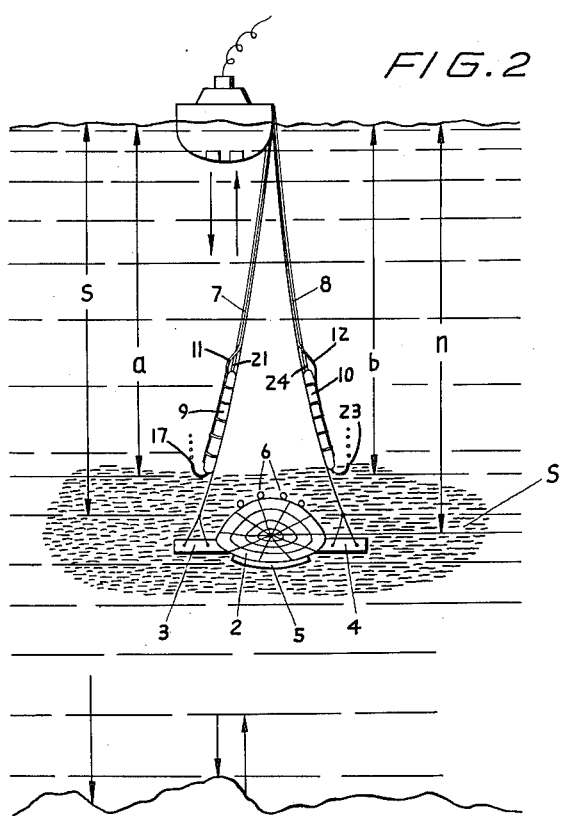
Fig. 2 shows the arrangement of the device illustrated in Fig. 1 as seen looking against the direction of motion.
Figure 3:
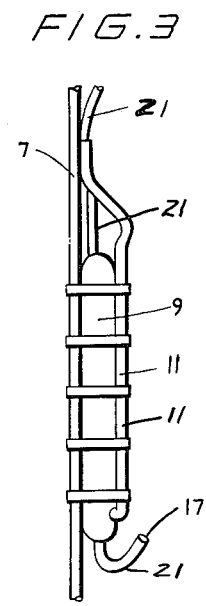
Fig. 3 is a detailed view of an element shown of Fig. 2.

Depth adjustment of the net can be changed by varying the static forces of buoyancy being effective on the net. For this purpose, air filled balloons 9 and 10, as shown in Figs. 1, 2 and 3, are attached to each line at the same distance from the net. Their volumes may be changed by filling them with air or by forcing it out. Therefore, the balloons 9 and 10 are connected through hose 11, 12 with a shipboard source of compressed air 13 and outlets 14, 14a (Fig. 4), Valves 15, 16, 15a, and 16a may either connect or interrupt the connection with the source of compressed air or the outlet, respectively.

Depth adjustment is accomplished by means of a special measuring arrangement. This arrangement makes use in the hydrostatic pressure at the net as standard for indexing the depth level of the net. From pressure chamber 13 (Fig. 4) through pressure hose 21 and by means of throttle valve 22 air is constantly fed down to the lower open end of the pressure hose. This throttle valve is set so that air is continuously admitted to pressure hose 21 and escapes at outlet 17. The flow of air may be observed at throttle valve 22 or in a hose 21; however, it is sufficient when, generally, the pressure in chamber 13 and valve 22 are set so that a limited flow is guaranteed at any depth level. For this purpose, pressure in chamber 13 may either permanently be maintained at such high level, by means of a compressor, not shown in the drawing, that sufficient surplus pressure is constantly available, or that pressure in chamber 13 may be regulated either by hand or automatically, dependent on the actual depth level of the net, so that it is always a little in excess of the water pressure at the depth level of the net. In case constant pressure is maintained in chamber 13 the throttle valve, at any depth, has to take care of the difference in pressure between that in the chamber and in hose 21, i. e., the actual water pressure at the net or at outlet 17, respectively. At constant throttle valve resistance this difference in pressure can only be balanced by adequate velocity in flow. On the other hand, however, the valve may be regulated by hand, depending on the actual depth level of the net so that generally velocity of flow is equal for all depth levels of the net. The pressure maintained for that purpose after throttle valve 22 is equal to that of the water column $a$ at the outlet 17, that is to say, equal to the depth level of the net $n$ diminished by height $n-a$ between outlet 17 and the center of the net. Changes of this height $n-a$ with depth level of the net and the speed of the vessel are so little that for finding the depth level $n$ the measured depth $a$ has only to be increased by the constant value $k$ in order to obtain from value $a$ the desired depth level value of the net $n$. Through tests and observations one may conclude that if the value of depth $a$ is known, the value of the net depth level $n$ may be determined by adding the value of the constant $k$ to the depth level $a$, the value of $k$ representing the average value of $n-a$ determined by measuring the values of $n-a$ in a series of tests.

Figure 4:
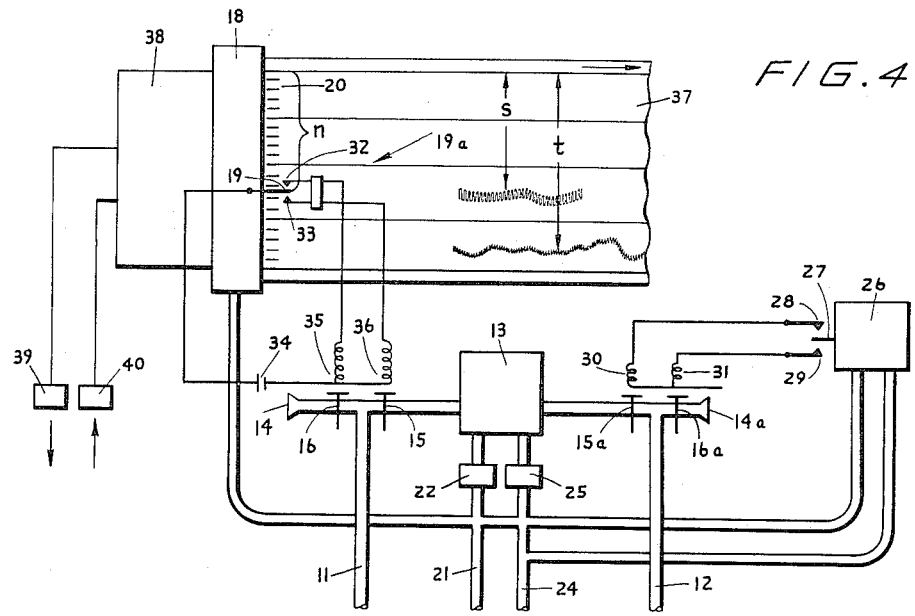
Fig. 4 shows a schematic diagram of the measuring arrangement of Figs. 1 and 2.

While air escapes from outlet 17, the air contained in hose 21 is under a practically uniform pressure, and when the air pressure in hose 21 is adjusted so that only a very slight volume of air escapes from outlet 17, the pressure differences between the air in hose 21 and the pressure of the water at the level of outlet 17 is very small. This pressure is measured by means of a pressure gauge 18, which in turn is gauged so that pointer 19 will indicate directly the actual depth level $n$ on a linear scale 20. The balloon 10 attached to the line 8 could be brought to the same pressure as maintained in balloon 9. On the other hand, however, and as shown in Fig. 4, arrangements could be made so that balloon 10 be connected separately through line 12 and different valves, 15a, 16a to the pressure chamber 13 and an exhaust 14a. Then more or less air supplied to the second balloon 10 will compensate wrong floating levels or tilting of the net which in turn may be perceptible through different adjustment of the two wings or inferred from a different height of the two wings or the ends of the lines 7 and 8. Observation of the floating position of the net will be needed for making such a correction. Therefore, a measuring arrangement is provided which will measure the difference of the hydrostatic pressure values at two separate points on each line, equally spaced from the net, i. e., at point 17 of line 7 where the air hose 21 ends, and at point 23 of the line 8 to which a second hose 24 is led down from the pressure chamber 13 by means of a throttle valve 25. By observing the flow of the air, throttles 22 and 25 may be adjusted so that even at the deepest floating level of the net the air pressure will be sufficient to displace the column of water, i. e., to blow the air out of the pressure hoses through the outlets 17 and 23. The difference of these pressure values will be measured by a manometer 26. As soon as its pointer 27 deviates from its zero position due to different depths a and b of hose ends 17 and 23, in other words due to different values in pressure, it actuates the valves 15a and 16a through contacts 28, 29 and relays 30, 31. Then the volume of balloon 10 will be reduced or increased, respectively, by opening the valves 15a or 16a for such a time until the proper floating level of the net is resumed and the values of depths a and b are equal.

Pointer 19 of the pressure gauge 18 is designed as a contact control for the depth-setting unit 19a. This adjustment of depth may be made by hand by means of the pointer which can be adjusted along dial 20, for instance, by two contacts 32, 33. As long as the pointer 19 will remain in the middle between the two contacts 32 and 33 the valves 15 and 16 are closed; if, however, the pointer will deviate from the value of depth determined by contacts 32, 33 to smaller values the circuit of a power source 34 is closed through relay 35 effecting connection of conduit 11 with the atmosphere through valve 16. From balloon 9 air will slowly escape passing conduit 11 and valve 16 until the net due to the decreasing volume of balloon 9, returns to greater depth, whereby the circuit of relay 35 opens again because of the returning pointer 19, and valve 16 is closed again. If, on the other hand, the net will deviate from the predetermined depth to greater depths, then pointer 19 will close the circuit of relay 36 through contact 33 thereby connecting balloon 9 via conduit 11 and valve 15 with the pressure chamber 13. By filling balloon 9 with air its volume and hence its buoyancy will increase, and the net will return to its buoyant position.

Just behind pointer 19 of the pressure gauge and control contacts 32, 33 passes a depth recorder chart 37 which is connected with an acoustic echo-sounder 38, having transmitter 39, and receiver 40 as shown diagrammatically. Echoes reflected from the bottom or from shoals of fish S and received by the echo-sounder will be recorded on the recorder chart paper 37 by means of a stylus, not shown on the drawing. The depth corresponding to the markings on the chart are read from the identical scale 20 on which the desired depth of the net is set by the pair of contacts 32, 33.

Proper depth setting of the net will only require adjustment of the control contacts 32, 33 to the depth range S of the shoal of fish indicated by the echo-sounder. The net will then be guided and maintained automatically at the depth predetermined by control contacts 32, 33 which is the depth range S of the shoal of fish. With pointer contact 19 engaging contacts 33 or 32, valve 15 or valve 16 will be opened until the net will arrive at the predetermined depth and pointer 19 will no more touch the contacts 32, 33. Proper level position of the net will be set by a differential manometer 26, the pointer 27 of which controls the second balloon 10 by contact relays 30, 31, and valves 15a, 16a. Differences in pressure which may appear in consequence of different depths of balloons 9 and 10 are compensated automatically.

In the modification shown in Fig. 5 a balloon 41 is attached through a pressure hose or conduit 42 to a pressure chamber 43 and an outlet 44 installed on board the ship. This conduit leads through a joint chamber 45 and two capillary tubes 46 or 47, respectively, or any other tubes of high flow resistance containing valves 48 and 49 to be opened alternately by a circuit which includes contacts 50, 51, and 52. The center contact 52 is mounted on a pointer 53, which in turn is connected to a pointer 54 of a pressure gauge which measures the depth level of the net so that contact 52 will be in center position provided that both the pointers are located in the same position. However, in case the pointer 54 which indicates the depth of the net moves downwards or upwards the center contact 52 will touch contacts 50 or 51, thus closing the circuit of electromagnet 56 or 57 adapted to open the valves 48 or 49. The gauge 55 which measures the depth of the net is connected with chamber 45 through conduit 55a.

Similar to the embodiment shown in Fig. 4 the gauge measuring the depth level of the net is combined with an echo-sounder to determine the depth of the sea and of the shoal of fish, both utilizing the same scale 58. Pointer 53 between contacts 50 and 51 can be adjusted by hand to the depth level desired. If, for instance, the net will first float in a depth of 110 meters, as shown in the drawing, this value being indicated by pointer 54 on chart 59 of the echo-sounder, and echo-sounding indicates a shoal of fish 60 in a depth of 140 meters, the switch with pointer 53 will be set to 140 meters thereby causing the contacts 51 and 52 to close, which in turn will open the valve 49 connecting the balloon 41 with air exhaust 44. Air will escape, reducing the buoyancy of the balloon, and at the same time air pressure in the balloon will rise due to increasing depth. Connection with this air exhaust 44 will be maintained until the level of the net will be same as that of the shoal of fish. As soon as this level is obtained pointer contact 52 will wander from contact 51 and permits valve 49 to return to its closed position. The net, thereupon, will remain in the depth of 140 meters as shown by graph 61, until another shoal of fish 62 will, for example, be recorded by depth recorder 63 at a depth of about 100 meters. The switch with pointer 53 will then be set to the depth level of this shoal of fish, thereby closing the contacts 50 and 52, which in turn will open the valve 48 and connect the pressure chamber with the balloon until the inflated balloon will adjust the net to the new depth, and the pointers 53 and 54 being in the same position, contacts 50 and 52 will disengage. During this time air has been admitted to the balloon thus increasing its buoyancy. Air pressure within the balloon has been reduced due to the decreasing depth of water.

Flow resistance of the capillary tubes 46 and 47 should be chosen in correspondence to the velocity required for net adjustment in order that air pressure in chamber 45 and depth measuring instrument 55 be equal to that in balloon 41. For quicker adjustment of the net the connection of said balloon with the compressed air reservoir 43 and the exhaust 44 could be made through conduits of wider diameter instead of capillary tubes; however, care has to be taken that during opening time of one of these two conduits connection of chamber 45 with the depth measuring instrument 55 is closed, so that this instrument will not give false indications.

This invention is not limited to the examples shown above but can also be altered to various modifications.

The first impulse for a change of the depth of the net is given by increasing or diminishing the quantity of the air contained in the balloons. The ensuing upward or downward motion will cause a change of water pressure and thereby a change of the volume of the air contained in the balloons and of their buoyancy which will accelerate the upward or downward motion of the net, the velocity of which may become excessive. In order to counteract this effect, it is expedient to reverse the flow of air to or from the balloons during their vertical motion after the first transfer of the air to or from the balloons initiating the motion, thereby facilitating the re-establishment of the equilibrium of upward and downward forces after the net has reached the desired depth level.

What we claim is:

1. An auxiliary fishing equipment adapted to be used from a fishing vessel comprising a fishing net, a pressure hose connected from the fishing net to the vessel, said pressure hose having an open lower end, means for supplying compressed air to said hose, means responsive to the air pressure in said hose indicating the depth of said net, and means responsive to the last named means for changing the depth of said net.

2. An auxiliary fishing equipment adapted to be used in association with a vessel comprising a fishing net, air inflatable members connected to opposite sides of the net, means separately supplying air to said air inflatable members, means for inflating one of said air inflatable members to adjust the depth level of said fishing net and means for inflating the other of said members to adjust the level of said net.

3. Fishing equipment adapted to be used on a vessel comprising a fishing net, lines connected to the vessel and the net, variable inflatable balloons attached to said lines adjacent the net, hose connections extending from said balloons to said vessel, a compressed air source connected to said hose on said vessel, means for adjusting the air pressure in said hose for controlling the inflation of said balloons, means for measuring the depth level of said balloons, and means responsive to the last named means for interrupting the connection between the compressed air source and the balloons.

4. Fishing equipment adapted to be used on a vessel for measuring the depth of a fishing net, lines connected to the vessel and the net, variable inflatable balloons attached to said fishing net, hose connections extending from said balloons to said vessel, a compressed air source, valve means for alternatively connecting and disconnecting said air source to said balloons for inflating and deflating the balloons to vary the buoyancy of said balloons, means for measuring the depth of the balloons, and means responsive to the depth of the balloons controlling said valve means.

5. A device as in claim 3, wherein said compressed air source is connected with said hose by an air conduit containing high flow resistance.

6. Fishing equipment adapted to be used in association with a vessel for measuring the depth of a fishing net and the depth of shoals of fish comprising a fishing net, lines connected to the vessel and the net, inflatable balloons connected to opposite sides of the fishing net, air pressure hose extending from said balloons to the vessel, a compressed air source disposed on said vessel and connected to said balloon by said hose for varying the buoyancy of said balloons, additional pressure hose extending from the vessel and terminating adjacent the balloons, said additional pressure hose being connected to the compressed air source, means responsive to the pressure in said additional hose indicating the depth of said balloons, and means responsive to the pressure in said additional hose controlling the connection between the compressed air source and the balloons.

7. In combination with fishing equipment including a fishing net, air inflated balloons attached to the fishing net, means including a hose connected to the balloons for inflating and deflating said balloons so as to vary their buoyancy, means for measuring the depth of the balloons, and means responsive to the last named means controlling the operation of said first named means.

8. Fishing equipment adapted to be used from a ship for controlling the depth of a fishing net comprising an air filled balloon connected to said fishing net, a hose connected from the ship to said balloon, a compressed air source disposed on said ship and connected to said hose for inflating said balloon, means for measuring the depth of said balloon, and means responsive to said last named means for controlling the flow of air between the compressed air source and the balloon.

9. Fishing equipment adapted to be used in association with a vessel for measuring the depth of a fishing net and the depth of schools of fish, comprising a fishing net, lines attached to said net and to said vessel, balloons adapted to be variably inflated and attached to said net, hose means extending from said vessel to said balloons, a compressed air source disposed on said vessel connected to said balloons by said hose means, means for adjusting the air pressure in said hose means for controlling the inflation, and thereby the buoyancy of the balloons and means on said vessel for measuring the depth level of said balloons.

10. Fishing equipment adapted to be used in association with a vessel for measuring the depth of a fishing net and the depth of schools of fish, comprising a fishing net, lines attached to said net and to said vessel, balloons adapted to be variably inflated and attached to opposite sides of said net, hose means extending from said vessel to said balloons, a compressed air source disposed on said vessel and connected to said balloons by said hose means, additional hose means extending from the compressed air source on said vessel to adjacent each of the balloons, means responsive to the pressure in one of said hose means controlling the connection between the compressed air source and one of the balloons, and means responsive to the differences of the pressures in each of the additional hose means controlling the connection between the compressed air source and the other of the balloons.

11. Fishing equipment adapted to be used in association with a vessel for measuring the depth of a fishing net and the depth of schools of fish comprising a fishing net, lines attached to said net and to said vessel, balloons adapted to be variably inflated and attached to opposite sides of said net, hose means extending from said vessel to said balloons, a compressed air source disposed on said vessel and connected to said balloons by said hose means, means responsive to the depth of one of said balloons controlling the connection between the air source and the last named balloon, and means responsive to the differences of the depths of each of the balloons for controlling the connection between the compressed air source and the other of the balloons.

References Cited in the file of this patent

UNITED STATES PATENTS

| 528,350 | Trouve | Oct. 30, 1894 |
| 532,962 | Hommerberg | Jan. 22, 1895 |
| 1,163,078 | Gandy | Dec. 7, 1915 |
| 1,255,034 | Mason | Jan. 29, 1918 |
| 2,593,995 | Deskin et al. | Apr. 22, 1952 |

FOREIGN PATENTS

| 70,706 | Norway | May 26, 1945 |
| 143,227 | Great Britain | Apr. 14, 1921 |
| 158,100 | Great Britain | Jan. 31, 1921 |